United States Patent [19]

Jassby

[11] Patent Number: 4,746,484
[45] Date of Patent: May 24, 1988

[54] FUSION REACTOR PUMPED LASER

[75] Inventor: Daniel L. Jassby, Princeton, N.J.

[73] Assignee: The United States of America as represented by the Department of Energy, Washington, D.C.

[21] Appl. No.: 92,987

[22] Filed: Sep. 4, 1987

[51] Int. Cl.$^4$ .......................... G21B 1/00; H01S 3/09
[52] U.S. Cl. .................................. 376/146; 376/133; 376/147; 372/73; 372/80
[58] Field of Search ............... 376/146, 147, 133, 326; 372/73, 74, 70, 80

[56] References Cited

U.S. PATENT DOCUMENTS

| | | | |
|---|---|---|---|
| 3,470,490 | 9/1969 | Held et al. | 376/326 |
| 3,886,483 | 5/1975 | Miley | 376/326 |
| 3,952,263 | 4/1976 | McArthur et al. | 376/326 |
| 4,091,336 | 5/1978 | Miley et al. | 372/73 |
| 4,110,703 | 8/1978 | Fletcher et al. | 372/73 |
| 4,160,956 | 7/1979 | Fader | 376/326 |
| 4,300,106 | 11/1981 | Frosch et al. | 372/73 |
| 4,398,294 | 8/1983 | Miller et al. | 372/73 |

OTHER PUBLICATIONS

Mumola et al., Applied Optics vol. 17, No. 6, (1978), p. 936.
Laser Interactions and Related Plasma Phenomena Hora et al., vol. 6, 1984, p. 47.
Progress in Nuclear Energy, vol. 8, 1981, p. 35, Prelas et al.
Boody et al., Radiation Energy Conversion in Space 61, 379, (1978).
Trans. ANS, 15, 633 (1972) Miley.
Sov. Phys. Dokl. 24(3), 189, (1979), Voinov et al.
Sov. Tech. Phys. Lett. 5(4), 171, (1979), Voinov et al.
Sov. Tech. Phys. Lett. 7(8), 437, (1981), Voinov et al.
Sov. Tech. Phys. Lett. 27(7), 819, (1982) Voinov et al.
Sov. Tech. Phys. Lett. 6(7), 352, (1980) MisKevich et al.

Primary Examiner—Harvey E. Behrend
Attorney, Agent, or Firm—Gustavo Siller, Jr.; Paul A. Gottlieb; Judson R. Hightower

[57] ABSTRACT

A nuclear pumped laser capable of producing long pulses of very high power laser radiation is provided. A toroidal fusion reactor provides energetic neutrons which are slowed down by a moderator. The moderated neutrons are converted to energetic particles capable of pumping a lasing medium. The lasing medium is housed in an annular cell surrounding the reactor. The cell includes an annular reflecting mirror at the bottom and an annular output window at the top. A neutron reflector is disposed around the cell to reflect escaping neutrons back into the cell. The laser radiation from the annular window is focused onto a beam compactor which generates a single coherent output laser beam.

20 Claims, 7 Drawing Sheets

FUSION REACTOR PUMPED LASER

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates generally to a nuclear pumped laser and more particularly to a laser which is pumped by a toroidal fusion reactor.

There is considerable interest in obtaining long pulse, high powered laser radiation at wavelengths that can propagate in the atmosphere, ranging from the near ultra-violet to the mid-infrared (approximately 0.2 to 2 $\mu$m. Lasers with a power greater than 0.1 megawatts may be useful in high resolution laser radar, communications with submarines and imaging of underwater environments. Lasers with power exceeding 10 megawatts may be useful for illuminating large remote areas, for drilling tunnels and possibly clearing airport fog. The power requirement of a laser for power transmission to satellites is in the range of from 1 to 100 megawatts. Another application for high powered lasers is in the launching of space vehicles where power in excess of 1 gigawatt per ton orbited is needed with a specific impulse of about 1000 seconds. Presently, there are several approaches for producing a high powered, long pulse laser radiation at wave lengths of less than 2 microns. Examples of devices for producing such radiation are chemical lasers, free electron lasers and nuclear pumped lasers.

Of particular interest to the present invention are nuclear pumped lasers. A substantial amount of work has been performed on developing lasers which are pumped by fission reactors. Examples of which are disclosed in U.S. Pat. Nos. 4,300,106, issued to Robert A. Frosch, which discusses a multiple path nuclear pumped laser; 4,398,294, issued to Thomas G. Miller, which discusses a high power nuclear photon pumped laser; 4,160,956, issued to Walter Fader, which discloses a nuclear pumped uranyl salt laser; 4,110,703, issued to James C. Fletcher, which discusses a $^3$He pumped laser; and 4,091,336, issued to George H. Miley, which discloses a direct nuclear pumped laser. All of these inventions use energetic neutrons or fission products from a fission reactor to directly or indirectly pump a laser. Specifically, there has been considerable experimental work done in pumping lasers with fission reactor neutrons via the $^3$He(n,p)T reaction, as disclosed by George H. Miley in "Review of Nuclear Pumped Lasers", Laser Interact. and Relat. Plasma Phenom., 6, 47 (1984); M. A. Prelas et al. in "A Review of the Utilization of Energetic Ions For the Production of Excited Atomic and Molecular States", Prog. and Nucl. Energy, 8, 35 (1981); and F. P. Boody et al. "Progress in Nuclear Pumped Lasers" Radiation Energy Conversation and Space, 379, (1978).

The use of controlled fusion devices for laser pumping has been proposed conceptually by George H. Miley in *Fusion Energy Conversion* and in Trans. Am. Nucl. Soc. 15, 633 (1972) by the same author. U.S. Pat. No. 3,952,263, issued to David McArthur, also generally proposes the concept of using a fusion reactor for laser pumping. However, to date, a scheme for harnessing the power of a fusion reactor and converting such power to useful laser radiation has not been developed.

A fusion reactor pumped laser would have several advantages over a fission reactor pumped laser. First, in a fusion reactor one neutron is available per 17.6 MeV, so that the system can be approximately 10 times more energetically favorable than a fission reactor. In a fission reactor, at most, one neutron can be made available per fission event (190 MeV) to react with the neutron converter.

Second, practically all the neutrons can be made to emerge from a fusion reactor, either by direct streaming or indirectly by reflection from neutron reflective surfaces. Thus, unlike a fission reactor, the laser cells and optical systems need not be installed in the reactor core itself in order to utilize all the free neutrons. From a safety and design viewpoint, it is desireable to decouple the reactor and the laser. Absorption or reflection of the neutrons in a fusion reactor has absolutely no effect on the fusion source.

Third, if $^3$He or some other gas is used for neutron conversion, the huge absorption cross section of neutron converter would require that excess reactivity be added to the fission system. This excess reactivity could cause a dangerous power excursion in the event of an escape of $^3$He or other neutron absorbing gas.

Fourth, a fusion reactor can have repetitive multigigawatt power rampups with no danger of fuel melting.

Therefore, in view of the above it is an object of the present invention to provide an arrangement for a nuclear pumped laser capable of realizing high laser power.

It is another object of the present invention to provide an arrangement for a nuclear pumped laser capable of realizing high laser power for long pulse lengths (1 second to 1000 seconds).

It is another object of the present invention to provide an arrangement for a nuclear pumped laser with a high electrical efficiency.

It is still another object of the present invention to provide an arrangement for a nuclear pumped laser which utilizes a fusion reactor as a neutron source.

Additional objects, advantages and novel features of the invention will be set forth in part, in the description which follows and in part will become apparent to those skilled in the art upon examination of the following or may be learned by practice of the invention. The objects and advantages of the invention may be realized and attained by means of the instrumentalities and combinations particularly pointed out in the claims.

SUMMARY OF THE INVENTION

To achieve the foregoing and other objects in accordance with the purposes of the present invention as embodied and broadly described herein, the present invention provides a nuclear pumped laser capable of producing very high quasi-continuous laser power. A toroidal fusion reactor is used to provide energetic neutrons which are slowed down by means of a moderator. The moderated neutrons are converted to energetic particles which are capable of pumping a lasing medium. An annular cell which houses the lasing medium is disposed around the outboard side of the toroidal fusion reactor. The cell includes a reflecting mirror disposed at the bottom of the cell and an output window disposed at the top of the cell. Neutron reflector material is disposed around the cell walls to reflect neutrons incident thereon back into the cell. The laser radiation eminating from the annular window in the cell is focused onto a beam compactor which generates a single coherent output laser beam.

DETAILED DESCRIPTION OF THE INVENTION

Figure 1:
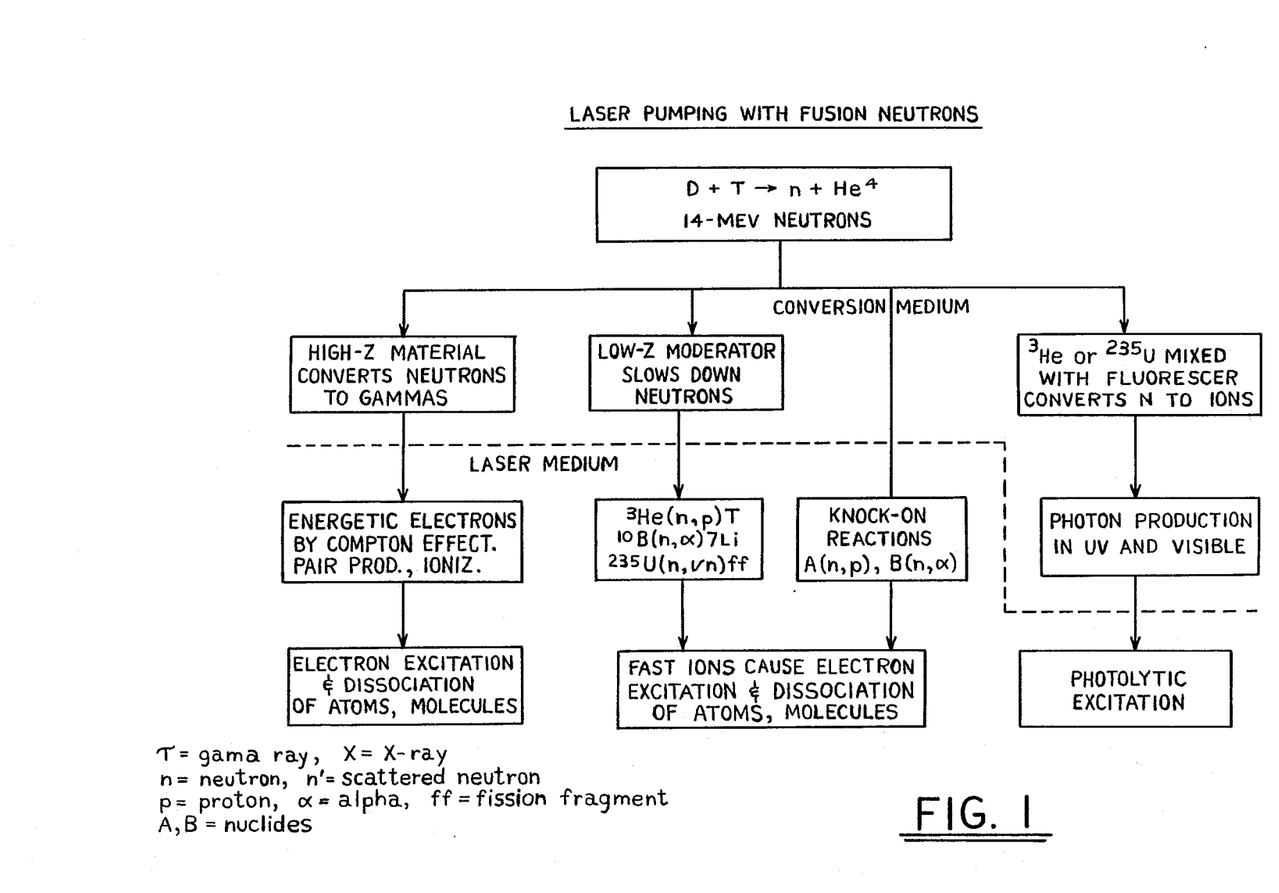
FIG. 1 is block diagram indicating how fusion neutrons can be converted to energetic particles for laser pumping.

In general, lasers are pumped by energetic electrons causing excitation, ionization and disassociation of the atoms or molecules in a lasing medium. FIG. 1 indicates how fusion neutrons can be converted to energetic ions, electrons or gammas for the purpose of laser pumping. The fusion neutrons can also be converted to ultraviolet or visible radiation for optical or photolytic pumping of the laser medium by one of these mechanisms. Fusion neutrons from toroidal fusion devices can thus be used to pump long pulsed, high-power lasers with wavelengths ranging from the near ultraviolet to the mid-infrared.

The most straightforward way to utilize fusion neutrons for laser pumping is to moderate (slow down) the fusion neutrons and generate energetic ions in a laser gas mixture by one of the reactions shown in Table 1. The fast ions in turn produce energetic electrons which are responsible for most of the atomic excitation. All lasers studied to date which have been pumped by fission reactor neutrons can also be pumped by fusion neutron sources of sufficiently high intensity.

TABLE I

ENERGETIC-ION PRODUCTION BY SLOW NEUTRONS

| REACTION | ENERGY IN CHARGED PRODUCTS | CROSS SECTION FOR THERMAL NEUTRONS (BARNS) |
|---|---|---|
| $3He(n,p)T$ | 0.76 MeV | 5300 |
| $6Li(n,a)T$ | 4.8 MeV | 920 |
| $10B(n,a)7Li$ | 2.35 MeV | 3800 |
| $235u(n,ff)FF$ | 165 MeV | 575 |

For present day tokamaks with relatively modest neutron fluxes, the most straightforward way to establish a laser pumping mechanism is to moderate the fusion neutrons and generate energetic ions in the lastant gas by the $^3He(n,p)H$ or $^{235}U$ (n,FF) reactions. He is especially attractive from the point of view of ease of use, safety, compatibility with numerous lasants, and uniform volumetric pumping. The $^3He$ reaction also generates the tritium needed to fuel the D-T fusion plasma. The $^3He$ (n,p)T reaction cross section decreased roughly inversely with the neutron velocity, so that nearly thermalized neutrons are desirable to permit reasonable pressures in laser gas. Thus, the energy spectrum of the source neutrons is of no concern. Inelastic scattering by the vacuum vessel, protective plate, and other paraphernalia associated with toroidal fusion devices, such as toamaks, have no adverse effects on this conversion method other than the absorption of a small fraction of the neutron flux.

Text books, such as, *An Introduction to Lasers and Masers* by A. E. Siegman show that the required pumping power density for He-Ne is ideally 0.5 mW/cc. This required power density can be obtained from a thermal neutron flux of approximately $10^{11}$ n/cm$^2$/s for $^3He$ at pressures near 300 torr. Although He-Ne is not a practical laser medium because of the low efficiency and the low power output, it may be useful for demonstrating feasibility.

To date, uncollided neutron fluxes at the vacuum vessel outboard wall for devices such as the Tokamak Fusion Test Reactor (TFTR) at the Princeton Plasma Physics Laboratory have been as large as $10^{10}$ n/cm$^2$/s in D-D operation with pulse lengths of 0.1–0.5s. For D-T operation TFTR should produce fusion power in the range of 10–25 MW, corresponding to uncollided neutron fluxes of $8 \times 10^{12}$ n/cm$^2$/s. Thus, D-T neutron fluxes from TFTR should comfortably drive a He-Ne oscillator.

An alternative to using $^3He$ is the excitation of a $^4He$-Ne mixture by fission fragments from the $^{235}U$ (n,FF) reaction. The 165-MeV FF energy would probably permit lasing at 0.633$\mu$ even with the neutron flux less than $10^{10}$ n/cm$^2$/s.

Other lasing medium such as He-Xe and Ar-Xe mixtures may be pumped in D-T operation of the TFTR with substantial enhancement of the uncollided flux. A. M. Voinov et al., Sov. Phys. Doklady 24 (1979) have reported that the threshold of thermal neutron flux for quasi-cw lasing on the 1.73$\mu$ and 2.63$\mu$ transitions of atomic Xe is in the range from $1-6 \times 10^{13}$ n/cm$^2$/s where mixtures of $^4He$+Xe, or Ar+Xe, were excited by fission fragments.

Compact ignition test tokamaks, such as the proposed Compact Ignition Tokamak (CIT) which is to be built at the Princeton Plasma Physics Laboratory, will be capable of producing fluxes exceeding $10^{15}$ n/cm$^2$/s, including both uncollided and scattered neutrons. These flux levels are sufficient to pump other lasing medium such as Cd, C, Kr, N, and Ar.

Figure 2:
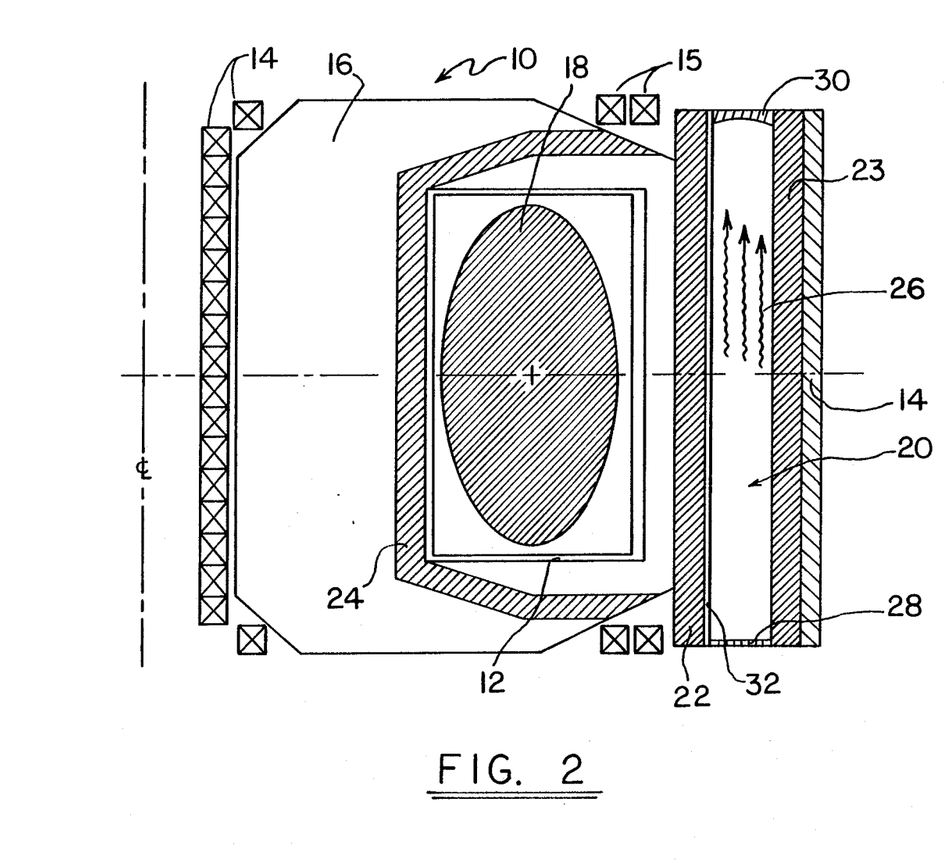
FIG. 2 is a schematic elevational view showing the basic configuration for the fusion pumped laser for the present invention.
Figure 3:
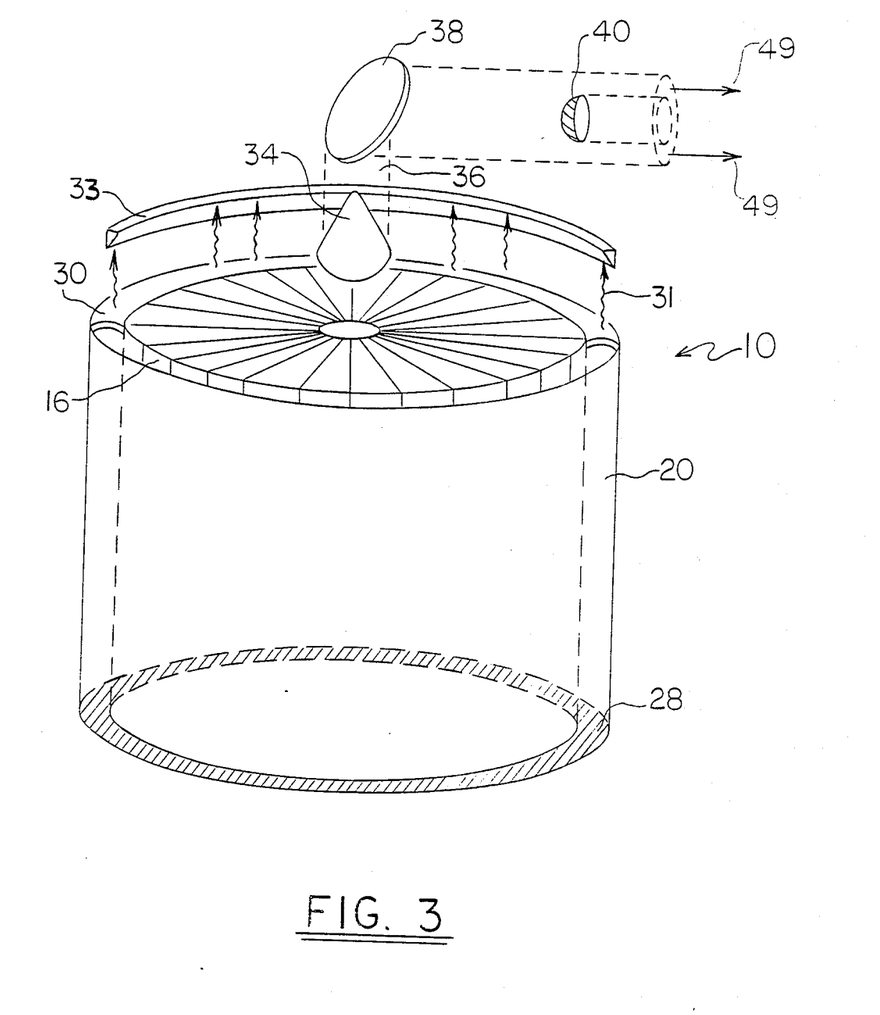
FIG. 3 is a schematic pictorial view of the fusion pumped laser of the present invention.

Referring specifically to FIGS. 2 and 3, where like elements are referred to with like numerals. A tokamak fusion reactor 10 is used as an energetic neutron source. Typically, a tokamak fusion reactor will include ohmic heating coils 14, equilibrium field coils 15, and toroidal field coils 16 which are typically made of copper or aluminum. A fusion plasma 18, which generates the energetic neutrons, is disposed in vacuum vessel 12. A slab of moderator material 22 is used to moderate the neutrons streaming through the vacuum vessel 12. The thickness of slab 22 will vary depending on the energy of the incoming neutrons, but may typically be 5 cm for D-D neutrons and about 15 cm for D-T neutrons. The moderated neutrons enter a sealed gas cell 20 which contains the lasing medium. A sheet of neutron reflective material 14 is disposed on the outboard side of cell 20 to reflect back any neutrons incident on the outboard cell wall. Preferably a slab of moderator material 23 is also disposed between the gas cell 20 and the neutron reflector 14. The neutron reflector may be made of reflector/multiplier materials such as beryllium, graphite or stainless-steel. This reflective material sheet enhances the neutron flux in cell 20. Preferably a slab of neutron reflector material 24 is placed on the inboard side of vacuum vessel 12 to further enhance the neutron flux into cell 20.

In a preferred embodiment of the present invention $^3$He, which is defined here as a fissile gas, is mixed with the lasing medium disposed in annular cell 20. The $^3$He interacts with the neutrons thereby generating energetic ions which produce the population inversion in the lasing medium by collisional energy transfer. Thus, the $^3$He is used to pump the lasing medium which in turn generates the laser radiation, represented by curved arrows 26. Other suitable fissile gases include $^{235}$UF$_6$, and $^{10}$BF$_3$.

Annular cell 20 includes a reflecting mirror 28 disposed at the bottom of the cell and an output window 30, which is transparent to the laser radiation, disposed at the top of the cell. A suitable window material may be quartz with a metal-oxide coating.

In another preferred embodiment of the present invention, the lasing medium in cell 20 is pumped by fission fragments. A fissile material 32 is disposed on the inner surface of annular cell 20, or on thin surfaces disposed throughout cell 20. The fissile material 32 interacts with the moderated neutrons and generates energetic fission fragments. The lasing medium may be pumped directly by the energetic fission fragments.

Alternatively, a host gas such as $^3$He may be mixed with a lasing medium in annular cell 20. The host gas is excited by the energetic fission fragments which in turn pumps the lasing medium. The lasing medium is thus partially pumped by the energy of the fission fragments and partially by the excited $^3$He gas.

The fissile material 32 may be any material in which the moderated neutrons will cause fission reactions to occur. Preferably the fissile material 32 is $^{235}$U, which may be in the form of thin coatings or foils of $^{235}$U-oxide. Other suitable materials may be other compounds of $^{235}$U, $^{239}$Pu, $^{10}$B and $^6$Li.

In another exemplary embodiment of the present invention the lasing gas is photolytically pumped by a fluorescent material such as XeF gas, a gas mixture of $^3$He-Xe or a gas mixture of $^3$He-Xe-Br-Ar.

Figure 4:
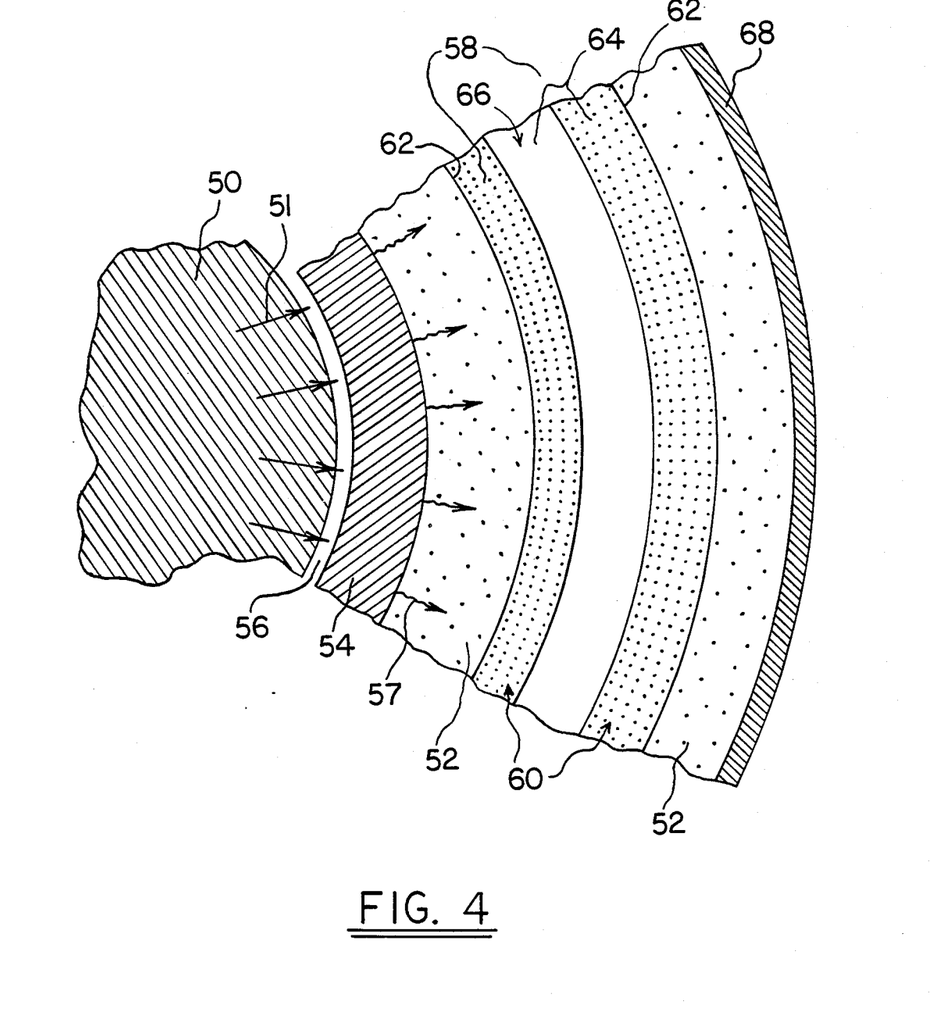
FIG. 4 is a schematic representation of the photolytic pumping arrangement of the present invention using a single continuous fluorescent gas cell.

Referring specifically to FIG. 4, a fusion plasma 50 generates energetic neutrons 51. The energetic neutrons 51 pass through vacuum vessel 56 and toroidal field coil 54 and are slowed down by neutron moderator 52. The moderated neutrons which are represented by curved arrows 57 interact with fluorescent and $^3$He gas mixture 58 which is disposed in a fluorescent gas cell 60. The interaction of the energetic ions produced from the $^3$He with the fluorescent material produces broadband ultraviolet or visible fluorescence which is then used to photolytically pump the laser gas 64. Optionally, $^6$Li vapor by itself may be used as a fluorescent material, with the $^6$Li interacting directly with the moderated neutrons.

An optical reflector 62 is disposed on the inner surfaces of cells 60 to reflect back photons which are incident on these surfaces. As in the embodiments of FIGS. 1 and 2, a neutron reflector 68 is disposed on the outboard side of cells 60 and 66 to reflect back any neutron incident on this surface. According to the present invention, the laser gas used in this embodiment may be any lasing gas which is capable of being photolytically pumped, examples of which are C$_3$F$_7$I and a mixture of XeF$_2$-N$_2$-SF$_6$.

It will become apparent to those skilled in the art that if a higher flux of photons is desired in the laser gas other optimal cell arrangements may be used. One such arrangement is disclosed in FIG. 5. In this arrangement, a plurality of generally circular cells 78 which house a lasing gas 80 are used instead of the continuous cell 66 arrangement shown in FIG. 4.

Figure 5:
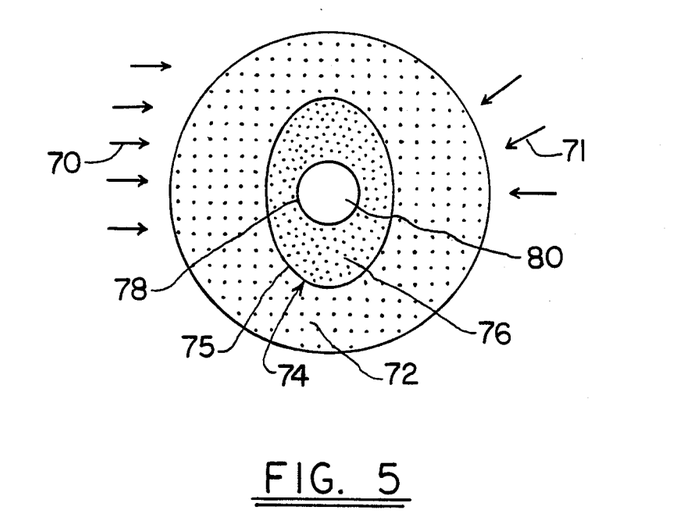
FIG. 5 is a schematic representation of the photolytic pumping arrangement of the present invention using individual circular cylindrical fluorescent gas cells.

Fusion neutrons 70 and scattered neutrons 71 are slowed down by neutron moderator 72. The moderated neutrons interact with fluorescent gas mixture 76 which is housed in fluorescent gas cell 74. A coating of optically reflective material 75 is disposed on the inner surface of cell 74. This arragement yields a higher concentration of photons incident on the laser gas 80 than the arrangement shown in FIG. 4.

The embodiments of the present invention have been described with reference to a gas laser medium, which necessitates the use of a moderator. If the laser medium is a liquid, or if the product of the laser gas pressure and laser cell thickness is very large, then the moderator 22 in FIG. 2 can be eliminated. The fusion neutrons will be decelerated in the laser medium itself by knock-on reactions with the atomic nuclei, as indicated in FIG. 1. The resulting energetic ions will cause the laser excitation. In this embodiment, it is unnecessary to use $^3$He or $^{235}$U, although the pumping power density can be increased by $^{235}$U fission fragments.

Similarly, in the case of photolytic pumping, if the fluorescent material is a liquid, moderator 72 in FIG. 5 can be eliminated. The fusion neutrons will be slowed down in the liquid fluorescer 76, examples of which are liquid Xe, XeF, and Kr. Fluorescence will occur as the neutrons give up their energy to the atoms in the liquid.

In another exemplary embodiment the laser media is excited by gamma rays through the processes of Compton scattering, pair production, and ionization, as indicated in FIG. 1. Fusion neutrons generate gamma rays by inelastic scattering when they strike materials such as copper or iron. The toroidal-field coils and the vacuum vessel of the tokamak are suitable for producing gammas from interaction with energetic fusion neutrons. Other materials, such as gadolinium, generate gamma rays by capture of slow neutrons. This type of materal would be combined with the neutron moderator. Gamma rays from both types of materials enter the laser cell located just behind the moderator. The laser medium may be either a liquid or a high-pressure gas.

Referring again to FIG. 3, a beam compactor is used to concentrate the laser radiation generated in annular gas cell 20. Laser radiation represented by curved arrows 31 eminates from output window 30 and is radially directed to a conical reflector 34 by a wraparound toroidal mirror 33. The laser radiation reflected from conical reflector 34 defines a single laser beam 36. The use of this beam compactor allows the total neutron emission of the fusion reactor to be used to pump a single high power laser beam 36. The use of the beam compactor also avoids excessively high laser power density from passing through output window 30.

Figure 6:
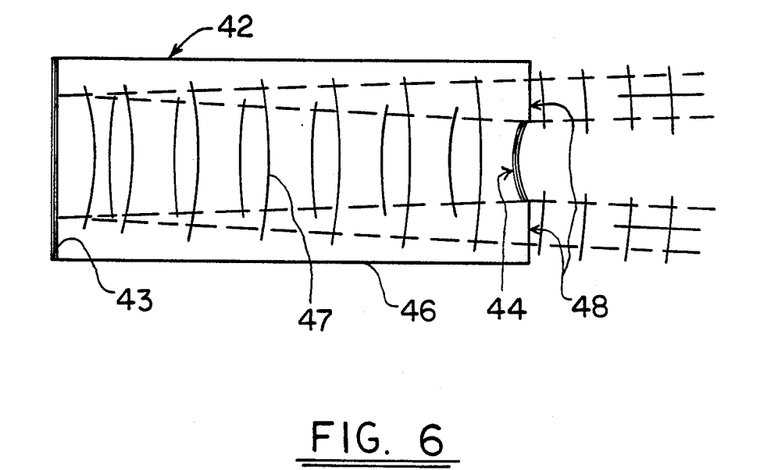
FIG. 6 is a schematic representation of the unstable optical resonator of the present invention.

Laser beam 36 may be used directly or may be coupled to an unstable optical resonator as shown in FIG. 3. The manner in which an unstable optical resonator functions is demonstrated schematically in FIG. 6, as explained in *An Introduction to Lasers and Masers*, by A. E. Siegman. Unstable optical resonator 42 is comprised of a tube 46, a flat reflecting surface 43 and a convex mirror 44. The wave front 47 which is reflected off of mirror 43 has a nearly constant amplitude across tube 46. Part of the wave front is reflected back from convex mirror 44 to surface 43. Diffractive cross-coupling forces uniform oscillation throughout the excited volume and insures spatial coherence of the output beam. The output beam, which eminates from areas 48, is a concentrated high power coherent laser beam. A single on-axis lobe appears in the far-field. That is, in the far field the laser beam appears to be eminating from a single continuous cylindrical source with minimal discontinuities.

The unstable optical resonator used in the present invention (shown in FIG. 3) consists of a turning mirror 38 which is positioned in the path of laser beam 36 and a spherical reflector 40 which acts as the convex mirror. The extracted laser power, illustrated by arrows 49, defines a single high power coherent laser beam. If an unstable resonator is not used, the window 30 must be a partially transmitting mirror.

In general, because there will be limited control of the magnitude and direction of the ambient magnetic field in a fusion pumped laser, it may be desireable to isolate the laser medium from those fields. A multiple layer magnetic shield around the laser cell can attenuate $B^f$ as required, but with the penalty of neutron loss in the shield. One approach is to have toroidal field coils which have contiguous outboard legs thin enough to minimize attenuation of the neutron flux. A compromise between discrete coils and homogeneous contiguous coils is shown in the perforated coil arrangement of the present invention illustrated in FIG. 7. This arrangement consists of contiguous toroidal field coils 82 with a pattern of periodic through-holes 84 in the outboard legs. Such toroidal field coils may be constructed of single-turn thick plates cooled by $D_2O$, with ceramic insulation 86 disposed between each coil. Because of the rapid fall-off of the fringing field through apertures 84, the perforated coil configuration excludes the toroidal magnetic field from the lasing medium as effectively as continuous coils.

Figure 7:
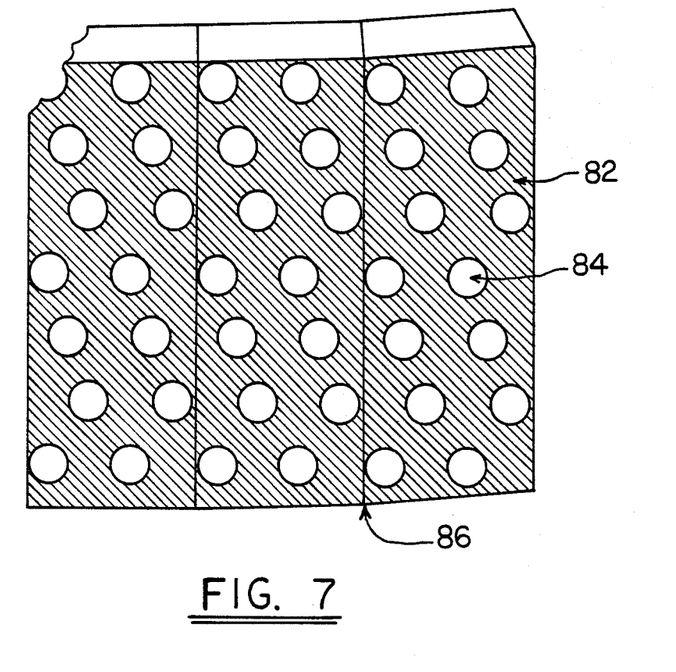
FIG. 7 is a schematic representation of the contiguous perforated toroidal field coils of the present invention.

The through-holes permit nearly 100% transmission of neutrons that are directly incident on the holes. With a configuration in which the penetrations comprising about 30% of the plate end-on cross section, most neutrons incident on the plate will eventually scatter into the holes 84 and are then likely to be transmitted with little loss. Overall, this configuration results in about 40% attenuation of the incident 14 MeV neutron flux.

The present invention has been described above with reference to a toroidal fusion reactor having copper toroidal field coils. In other preferred embodiments, toroidal field coils made of materials that are superconductors at liquid-nitrogen temperature may also be used. Such coils would allow greater overall system efficiency than copper coils, and incur less operating power and cost than liquid-helium-cooled coils.

In the case of external laser gas cells, as shown in FIGS. 2 and 4, superconductors cannot be used as contiguous toroidal field coils. However, a discrete superconducting coil arrangement may be used. The neutrons streaming between the outboard coil legs may be utilized. As before, neutron scattering in the moderator will give adequately homogeneous power deposition in the laser cells. In this arrangement appropriate shielding must be used for the coils. Optionally a laser gas cell internal to the toroidal field coils may be used.

Figure 8:
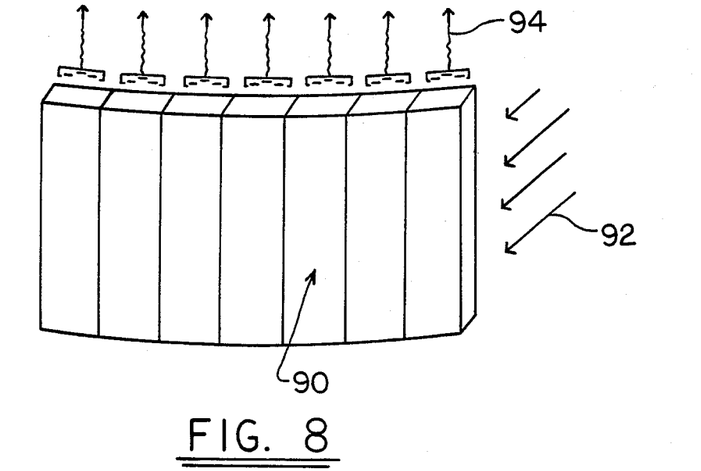
FIG. 8 is a schematic representation of the compartmentalized laser cavity of the present invention.

In the arrangement shown in FIG. 8 the cell which houses the lasing gas is compartmentalized into a plurality of individual gas cells 90. Fusion neutrons 92 interact with the lasing medium and the host gas in each individual cell 90 generating laser radiation 94. This compartmentalized arrangement may be useful in experiments devised to determine properties of various combination of lasing medium and host gas. Each individual gas cell 90 may be filled with a different lasing medium, a different host gas, or may be filled with the same lasing medium and host gas at different pressures.

Figure 9:
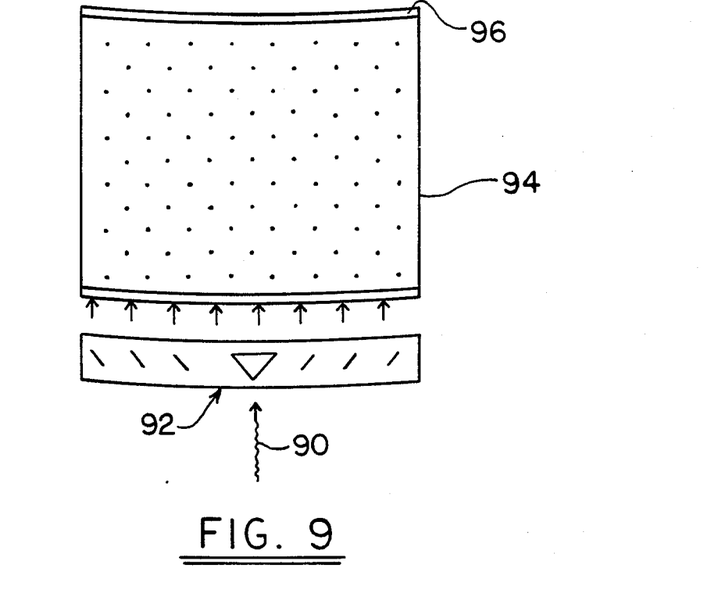
FIG. 9 is a schematic representation of the amplifier arrangement of the present invention.

If the excited medium has a very high gain, the annular gas cell 20 shown in FIG. 3 may be utilized as a single pass amplifier of a low power laser beam. Such an arrangement is shown schematically in FIG. 9. A low-powered laser beam 90 is spatially expanded by beam splitter 92 such that it illuminates the entire bottom of the annulus. The laser radiation is amplified in laser gas cell 94 and eminates through window 96. The amplified annular beam may then be contracted to a circular beam by a beam compactor as shown in FIG. 3 but without the unstable resonator. The advantages of the amplifier mode are possibly more effective use of a very high volume, a high pressure excited medium, simpler optics (desirable in intense nuclear radiation fields), and alleviated impact of heat and vibration.

Figure 10:
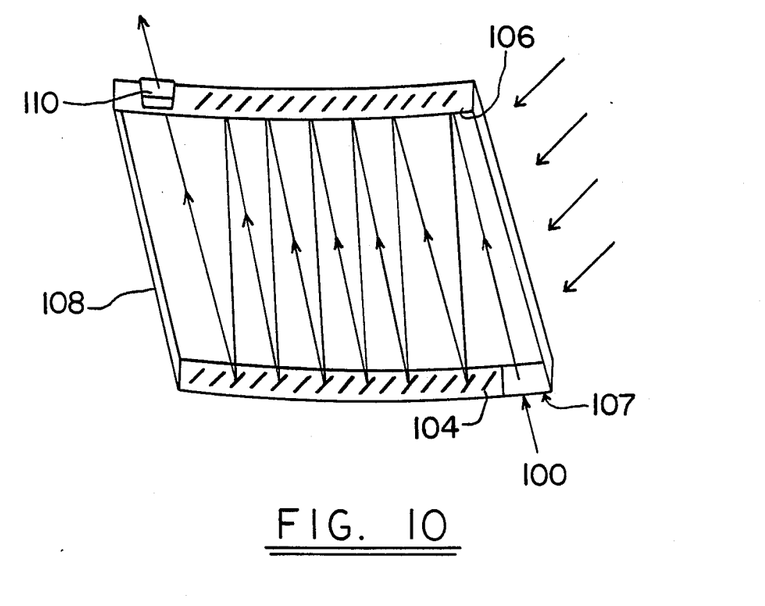
FIG. 10 is a schematic representation of the multiple-path laser cavity of the present invention.

For an amplifier which utilizes an annular gas cell having shorter dimensions, the multiple path laser cavity arrangement shown in FIG. 10 may be used. This arrangement would allow the use of a gas cell with shorter vertical dimensions while permitting adequate gain. A low power laser beam 100 enters into gas cell 108 through window 107. The low-powered laser beam 100 is amplified in gas cell 108 as it bounces between mirrors 104 and 106. The amplified laser beam exits gas cell 108 through window 110.

The various embodiments of the present invention which have been disclosed thus provide arrangements in which the power of energetic neutrons from a toroidal fusion reactor is used to generate a single high powered coherent laser beam. The energetic neutrons from the fusion reactor are moderated before entering a gas cell containing a lasing gas medium. The moderated neutrons are converted into particles which are used to pump the lasing medium. An annular cell houses the lasing medium and is disposed around the outboard side of a fusion reactor. The laser radiation generated by the lasing medium is then focused onto a beam compactor which generates a single output laser beam.

The foregoing description of the preferred embodiments of the invention has been presented for purposes of illustration and description. It is not intended that these embodiments be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention and various embodiments and with various modifications as are suited to the practical use contemplated. It is intended that the scope of the invention be defined by the claims appended hereto.

The embodiments of the invention in which an exclusive property or privilege is claimed are defined as follows:

1. A nuclear pumped laser comprising:
   a toroidal fusion reactor, said reactor generating energetic neutrons;
   an annular gas cell disposed around the outer periphery of said reactor, said cell including an annular reflecting mirror disposed at the bottom of said cell and an annular output window disposed at the top of said cell;
   a gas lasing medium disposed within said annular cell for generating output laser radiation;
   neutron reflector material means disposed around said annular cell for reflecting neutrons incident thereon back into said gas cell;
   neutron moderator material means disposed between said reactor and said gas cell and between said gas cell and said neutron reflector material for moderating the energy of energetic neutrons from said reactor;
   converting means for converting energy from said moderated neutrons to energy pumping means for pumping said gas lasing medium; and
   beam compactor means for receiving output laser radiation from said annular output window and generating a single output laser beam therefrom.

2. The nuclear pumped laser of claim 1 wherein said beam compactor means comprises:
   wrap-around toroidal mirror means for receiving substantially all of the output laser radiation from said annular output window and radially focusing said output laser radiation to a focal volume along the major axis of said toroidal fusion reactor; and
   conical reflector means disposed in said focal volume for receiving the radially focused radiation from said wrap-around toroidal mirror means and generating a single laser beam therefrom.

3. The nuclear pumped laser of claim 2 further comprising unstable resonator means coupled to said laser beam for generating a high power coherent beam from said single laser beam.

4. The nuclear pumped laser of claim 3 wherein said unstable resonator means comprises:
   a generally circular shaped reflector positioned above said conical reflector means in the path of said laser beam, said circular reflector positioned at an angle such that said laser beam reflected away from said conical reflector means;
   a hemi-spherical reflector disposed in the path of said reflected beam, the diameter of said hemi-spherical reflector being smaller than the diameter of said reflected beam, the convex portion of said hemi-spherical reflector facing said circular reflector and said hemi-spherical reflector positioned in the center of said beam.

5. The nuclear pumped laser of claim 2 wherein said converting means is a fissile gas mixed with said lasing medium, said fissile gas generating energetic ions from a fission reaction between said moderated neutrons and said fissile gas, said energetic ions defining said pumping means.

6. The nuclear pumped laser of claim 5 wherein said gas lasing medium comprises a gas selected from the group consisting of Cd, C, Xe, Kr and Ne and wherein said fissile gas is selected from the group consisting of $^{235}UF_6$, $^{10}BF_3$ and $^3He$.

7. The nuclear pumped laser of claim 2 wherein said converting means comprises a coating of a fissile material deposited on the inner surface of said cell, said fissile material coating producing fission fragments upon the incidence of said moderated neutrons theron, said fission fragments defining said pumping means.

8. The nuclear pumped laser of claim 7 further including an excitable gas mixed with said lasing medium said excitable gas being excited by the incidence of said fission fragments thereon, said excited gas defining said pumping means.

9. The nuclear pumped laser of claim 8 wherein said lasing medium is Xe, said fissile material is selected from the group consisting of $^{235}U$, $^{239}Pu$, $^{10}B$, and $^6Li$ and said excitable gas is selected from the group consisting of Ar and $^4He$.

10. The nuclear pumped laser of claim 2 wherein said converting means comprises photon producing means comprising fluorescent gas cell means encircling said lasing medium cell, an optical reflector on the inner surface of said fluorescent gas cell means, and fluorescent gas means disposed in said fluorescent gas cell means for producing photons upon the incidence of said moderated neutrons thereon, said photons defining said pumping means.

11. The nuclear pumped laser of claim 1 wherein said lasing medium is a gas selected from the group consisting of a mixture of $XeF_2$-$N_2$-$SF_6$ and $C_3F_7I$ and wherein said fluorescent gas means is selected from the group consisting of XeF, a mixture of $^3$He-Xe and a mixture of $^3$He-Xe-Br-Ar.

12. The nuclear pumped laser of claim 4 wherein said annular reflecting mirror disposd at the bottom of said first cell is 100% reflecting whereby said annular gas cell defines a laser resonator.

13. The nuclear pumped laser of claim 4 wherein said neutron moderator material means is a material seleted from the group consisting of $D_2O$, $CH_2$ and $CD_2$.

14. The nuclear pumped laser of claim 4 wherein said neutron reflector material means is a material selected from the group consisting of beryllium, graphite and stainless-steel.

15. A nuclear pumped laser comprising:
   a toroidal fusion reactor, said reactor generating energetic neutrons;
   an annular gas cell disposed around the outer periphery of said reactor, said cell including an annular reflecting mirror disposed at the bottom of said cell and an annular output window disposed at the top of said cell;
   a gas lasing medium disposed within said annular cell for generating output laser radiation;
   neutron reflector material means disposed around said annular cell for reflecting neutrons incident thereon back into said gas cell;
   neutron moderator material means disposed between said reactor and said gas cell and between said gas cell and said neutron reflector material for moderating the energy of energetic neutrons from said reactor;
   converting means for converting energy from said moderated neutrons to energy pumping means for pumping said gas lasing medium;
   beam compactor means for receiving output laser radiation from said annular output window and generating a single output laser beam therefrom; and unstable resonator means coupled to said single laser beam for generating a high-power, coherent laser beam from said single laser beam.

16. The nuclear pumped laser of claim 15 wherein said beam compactor means comprises:

wrap-around toroidal mirror means for receiving substantially all of the output laser radiation from said annular output window and radially focusing said output laser radiation to a focal volume along the major axis of said toroidal fusion reactor and;

conical reflector means disposed in said focal volume for receiving the radially focused laser radiation from said wrap-around toroidal mirror means and generating a single laser beam therefrom.

17. The nuclear pumped laser of claim 16 wherein said unstable resonator means comprises:

a generally circular shaped reflector positioned above said conical reflector means at an angle such that said laser beam is incident thereon and reflected away from said conical reflector means;

a hemi-spherical reflector disposed in the path of said reflected beam, the diameter of said hemi-spherical reflector being less than the diameter of said reflected beam, the convex portion of said hemi-spherical reflector facing said circular reflector and said hemi-spherical reflector positioned in the center of said beam.

18. The nuclear pumped laser of claim 17 wherein said converting means is a fissile gas mixed with said lasing medium, said fissile gas generating energetic ions from a fission reaction between said moderated neutrons and said fissile gas, said energetic ions defining said pumping means.

19. The nuclear pumped laser of claim 17 wherein said converting means comprises a coating of a fissile material deposited on the inner surface of said cell, said fissile material coating producing fission fragments upon the incidence of said moderated neutrons thereon, said fission fragments defining said pumping means.

20. The nuclear pumped laser of claim 17 wherein said converting means comprises photon producing means, said photon producing means comprising fluorescent gas cell means encircling said lasing medium cell, an optical reflector on the inner surface of said fluorescent gas cell means, and a mixture of fluorescent gas and a fissile gas disposed in said fluorescent gas cell means for producing photons upon the incidence of said moderated neutrons thereon, said photons defining said pumping means.

* * * * *